United States Patent
Calapini et al.

(10) Patent No.: US 7,138,151 B2
(45) Date of Patent: Nov. 21, 2006

(54) CALCIUM-FORTIFIED ACIDIC BEVERAGES

(75) Inventors: Sarah A. Calapini, Mandaluyong (PH); Donna L. Valencia, Pasig (PH); Kennie U. Dee, Quezon (PH)

(73) Assignee: Unilab Pharmatech, Ltd., Central Hong Kong (CN)

( * ) Notice: Subject to any disclaimer, the term of this patent is extended or adjusted under 35 U.S.C. 154(b) by 396 days.

(21) Appl. No.: 10/302,169

(22) Filed: Nov. 22, 2002

(65) Prior Publication Data

US 2004/0101597 A1   May 27, 2004

(51) Int. Cl.
*A23L 1/304* (2006.01)
*A23L 2/00* (2006.01)
(52) U.S. Cl. .......................... 426/74; 426/521; 426/599
(58) Field of Classification Search .................. 426/74, 426/599, 521
See application file for complete search history.

(56) References Cited

U.S. PATENT DOCUMENTS

| | | | |
|---|---|---|---|
| 4,722,847 A | 2/1988 | Heckert | |
| 4,737,375 A | 4/1988 | Nakel et al. | |
| 4,772,467 A | 9/1988 | Pak | |
| 4,851,221 A | 7/1989 | Pak et al. | |
| 4,871,554 A | 10/1989 | Kalala et al. | |
| 5,128,374 A | 7/1992 | Kochanowski | |
| 5,851,578 A * | 12/1998 | Gandhi | 426/590 |
| 2002/0037353 A1 * | 3/2002 | Villagran et al. | 426/590 |
| 2004/0161496 A1 * | 8/2004 | Bouman et al. | 426/74 |

* cited by examiner

*Primary Examiner*—Helen Pratt
(74) *Attorney, Agent, or Firm*—Thomas T. Aquilla

(57) ABSTRACT

Calcium-fortified acidic beverages that are stable against calcium precipitation when stored for prolonged period at room temperature and elevated temperatures.

23 Claims, No Drawings

CALCIUM-FORTIFIED ACIDIC BEVERAGES

BACKGROUND OF THE INVENTION

1. Field of the Invention

The present invention relates to formulations of calcium fortified acidic beverages that are stable against calcium precipitation when stored for prolonged period at room temperature and elevated temperatures.

2. Description of Related Art

Calcium is the most abundant mineral in the body and is a major constituent of bone and teeth. Calcium is also involved in several physiological systems such as blood clotting, increasing cell membrane permeability, activating a number of enzymes, and acting as component in neural transmission and muscular contraction. Calcium deficiency may be a factor in the development of osteoporosis in elderly people.

Since the body does not produce calcium, it is totally dependent on external supply of calcium, which is nutritional or supplementary. Calcium may be obtained from various dietary sources, of which the primary sources are dairy products, in particular milk. Milk, however, is not generally consumed in sufficient quantities by the general population to obtain needed levels of calcium. One reason is that milk may be unattractive as a drink for social occasions. Also, a significant number of individuals are lactose intolerant, resulting in gastrointestinal problems if milk is consumed.

To increase the consumption of calcium, a more appealing alternative to milk is apparently needed. Beverages, which are consumed often by the general public, have been used as a vehicle for achieving greater calcium intake. Calcium supplementation in beverages, however, has been generally limited to liquid beverages of short shelf lives requiring refrigeration. For example, Sunny Delight® Orange with Calcium of Procter and Gamble, Cincinnati, Ohio, USA, contains calcium citrate malate and is labeled as being protected by U.S. Pat. No. 4,737,375. Tropicana® Orange with Calcium of Tropicana Products, Inc., Bradenton, USA, also contains calcium citrate malate and is labeled as being protected by U.S. Pat. No. 4,722,847. Minute Maid® Orange with Calcium of the Coca-Cola Company, Houston, Tex., USA, contains calcium lactate and tricalcium phosphate according to U.S. Pat. No. 4,871,554.

Short shelf-life natural fruit beverages requiring refrigeration are normally pasteurized at about 75° C. to preserve the flavor. Aseptic pasteurization at higher temperature, normally 95° C., allows natural fruit beverages to be stored longer and without refrigeration, but with consequent loss in flavor quality. Aseptic pasteurization is performed on other acidic beverages such as tea, cola, and those containing artificial or nature-identical flavors. These long shelf-life acidic beverages are packed in bottles and aseptic cartons, and normally have shelf lives of 5–10 months without refrigeration.

It is extremely difficult to fortify long shelf-life acidic beverages with calcium because of their organic acids, in particular citric and/or malic acid, which are naturally present in most fruits or added in artificially flavored beverages for sourness. When a soluble salt of calcium is added to get a clear beverage, the calcium eventually forms calcium citrate or calcium malate, which because of their poor solubility precipitate out of solution. The formation of the precipitate is generally faster at higher temperature, making it more difficult to fortify acidic beverages that do not require refrigeration.

Further, when highly soluble salts of calcium are used, undesirable taste becomes a problem. For example, calcium acetate tastes vinegary, calcium chloride salty. Insoluble calcium salts cannot be used since they sediment rapidly out of solution making the product aesthetically unpleasant, and which may lead to incomplete intake of the added calcium. Emulsification of insoluble calcium salts by surfactants can lead to off-taste and opacity that is aesthetically undesirable for acidic beverages.

It has been found that organic salts of calcium are generally more bioavailable than the inorganic salts. For example, U.S. Pat. Nos. 4,772,467 and 5,128,374 teach the use of calcium citrate and calcium citrate malate, respectively, to treat osteoporosis. Calcium citrate and calcium malate are fairly insoluble and their direct use in liquid beverages can lead to problems previously described with insoluble calcium salts. However, calcium citrate can be formed in-situ by reacting a fairly insoluble calcium base selected from calcium carbonate, calcium oxide, and calcium hydroxide with citric acid as described in U.S. Pat. No. 4,851,221. The calcium citrate thus formed is in a metastable state, which eventually precipitates to the low equilibrium solubility of calcium citrate. As mentioned previously, precipitation generally occurs faster at higher temperature making it difficult or almost impossible to incorporate in-situ formed calcium citrate, calcium malate, and calcium citrate malate that is resistant to precipitation for at least five months at room temperature, and at least two months at 50° C. to ensure the product survives spikes of high temperature during transport and warehouse storage. In tropical countries, it is not unusual for a warehouse with ambient cooling to reach temperatures of up to 40° C.

In-situ formed calcium citrate, calcium malate, and calcium citrate malate are good calcium sources for acidic beverages since they blend very well with fruit flavors and iced tea, without the chalky aftertaste of calcium. The prior art does not teach how these calcium sources can be stabilized against precipitation in long shelf-life acidic beverages not requiring refrigeration.

SUMMARY OF THE INVENTION

A palatable, calcium-fortified acidic beverage comprising significant amount of in-situ formed calcium citrate, calcium malate, or calcium citrate malate at a pH of about 6 and below, further comprising calcium chloride and calcium lactate gluconate, wherein the calcium is stable against precipitation for prolonged period at room temperature and elevated temperatures.

DETAILED DESCRIPTION OF THE INVENTION

Discussion

U.S. Pat. No. 4,851,221 discloses a dry powder mixture containing citric acid and a calcium base selected from calcium hydroxide, calcium oxide, and calcium carbonate, which may be used for making an instant liquid beverage of soluble calcium citrate. The citric acid and calcium base of this invention react to form a clear metastable solution initially, but the in-situ solubilized calcium citrate starts to precipitate out of solution within 24 hours, eventually leaving just enough calcium citrate in solution equivalent to the equilibrium solubility of calcium citrate.

U.S. Pat. No. 4,722,847 discloses a fruit juice beverage supplemented with calcium citrate malate, where the soluble calcium citrate malate is formed in-situ by reacting citric and malic acid with either calcium hydroxide or calcium carbonate. The mixture of citrate and malate ions prolongs the duration of the metastable equilibrium adequate enough to produce a short shelf-life beverage requiring refrigeration (Tropicana® Orange with Calcium). The patent does not teach how calcium citrate malate can be combined with calcium chloride and calcium lactate gluconate to produce a long shelf-life acidic beverage not requiring refrigeration.

This instant invention provides formulations of calcium-fortified acid beverages that are palatable and stable against calcium precipitation for prolonged periods at room temperature and elevated temperatures. The calcium comprises: 1). in-situ formed calcium citrate, calcium malate, or calcium citrate malate, formed respectively by reacting citric acid, malic acid, and a combination of citric and malic acid with a calcium base selected from calcium hydroxide, calcium oxide, calcium carbonate, and mixtures thereof; 2). calcium chloride; and 3). calcium lactate gluconate.

The first calcium source of this instant invention is in-situ formed calcium citrate, calcium malate, or calcium citrate malate, formed respectively by reacting citric acid, malic acid, and a combination of citric and malic acid with a calcium base selected from calcium hydroxide, calcium oxide, calcium carbonate, and mixtures thereof. Citric and/or malic acid can be added extraneously or may come directly from the fruit sources in the case of natural fruit beverages. Citrus fruits such as orange and lemon are rich in citric acid, while apple is rich in malic acid. Whether the citric and/or malic acid is added extraneously, or comes from the fruit sources, or a combination, the amount of citric and/or malic acid must be equal or greater than the amount to completely neutralize the calcium base. The total excess acidity which includes excess citric and/or malic acid, and other naturally present fruit acids such as tartaric acid in the case of grapes and grapefruits, is preferably between 0.1–2% w/v, more preferably between 0.2–1.5% w/v, and most preferably 0.3–1% w/v. The amount of calcium from this first source is preferably between 30–60% of the total calcium.

In-situ formed calcium citrate, calcium malate, or calcium citrate malate will precipitate out of solution when exposed for prolonged period at high temperatures. Two soluble calcium sources are used in this instant invention to prevent in-situ formed calcium citrate, calcium malate, or calcium citrate malate from precipitating. Without wishing to be bound by theory, it is believed that the anions of these two soluble calcium salts interfere with the formation of crystal nuclei of calcium citrate, calcium malate, and calcium citrate malate. In the absence of the seed crystal nuclei, crystal growth cannot proceed.

One of the two soluble calcium salts is calcium chloride. Calcium chloride is salty and should not be used at levels above 0.15% w/v (as anhydrous calcium chloride) to maintain palatability of the final product. The calcium chloride level is preferably below 0.1% w/v (as anhydrous calcium chloride).

The other soluble calcium salt is calcium lactate gluconate, which is a mixture of calcium lactate and calcium gluconate available from Glucona B.V. of the Netherlands under the name Gluconal CAL. Gluconal CAL is a physical mixture of 80% w/w calcium gluconate and 20% w/w calcium lactate, whose instantaneous solubility is higher than the individual components. In particular, the solubility of Gluconal CAL at 25° C. expressed as dissolved calcium is 4.5% w/v compared to 0.35% w/v for calcium gluconate and 1.2% w/v for calcium lactate pentahydrate. In this instant invention, calcium lactate gluconate will refer not only to Gluconal CAL but also to any synergistic physical mixture of calcium gluconate and calcium lactate where the calcium gluconate is greater than 20% w/w, and where the solubility of the mixture is at least 2% w/v expressed as dissolved calcium. Although calcium lactate gluconate is soluble, its use in acidic beverages can still lead to calcium precipitation due to the calcium citrate, calcium malate, or calcium citrate malate that is formed from the calcium and the organic acid(s) of the beverage. Calcium lactate gluconate has a bland taste, and when used in the instant invention should preferably be less than about 1.5% w/v, more preferably less than about 1% w/v, and most preferably less than about 0.7% w/v.

The pH of the acidic beverage of this invention is less than about 6, and contains at least one flavor. The term flavor includes both natural and artificial flavors. Natural flavors include but not limited to fruit juices, vegetables, and tea. The amount of flavor employed depends on the selected flavor(s) and the flavor impression desired.

The acidic beverage m ay further contain other ingredients normally found in acidic beverage including but not limited to colorants; preservatives; cloudifiers; sweeteners; high-intensity artificial sweeteners; vitamins and minerals; pH modifiers such as sodium citrate and potassium citrate; viscosity modifiers or bodying agents such as guar gum, gum tragacanth, gum arabic, pectin, xanthan gum, and carrageenan; antioxidants; and emulsifying agents.

For a desired calcium concentration in the final product, the combination of the three calcium sources for optimum taste and stability, within the bounds described above, can be readily determined by a person ordinarily skilled in the art through appropriate application of design of experiments. Accordingly, it is to be understood that the embodiments of the invention described in the experiments below are merely illustrative of the application of the principles of the invention. Reference herein to details of the illustrated embodiments is not intended to limit the scope of the claims, which themselves recite those features regarded as essential to the invention.

EXPERIMENT 1

|  | % w/v | | | | | |
| --- | --- | --- | --- | --- | --- | --- |
|  | 1A | 1B | 1C | 1D | 1E | 1F |
| $Ca(OH)_2$ | 0 | 0 | 0.22 | 0.17 | 0.14 | 0.1 |
| $CaCl_2.2H_2O$ | 0 | 0.1 | 0 | 0.1 | 0.1 | 0.1 |
| Gluconal CAL | 1.14 | 0.88 | 0 | 0 | 0.16 | 0.36 |
| Citric acid for Neutralization | 0 | 0 | 0.38 | 0.29 | 0.24 | 0.17 |
| Excess Citric acid | 0.5 | 0.5 | 0.5 | 0.5 | 0.5 | 0.5 |
| Xanthan Gum | 0.036 | 0.036 | 0.036 | 0.036 | 0.036 | 0.036 |
| Yellow 5 | 0.0003 | 0.0003 | 0.0003 | 0.0003 | 0.0003 | 0.0003 |
| Yellow 6 | 0.0016 | 0.0016 | 0.0016 | 0.0016 | 0.0016 | 0.0016 |
| Orange Flavor | 0.25 | 0.25 | 0.25 | 0.25 | 0.25 | 0.25 |
| Aspartame | 0.02 | 0.02 | 0.02 | 0.02 | 0.02 | 0.02 |
| Acesulfame potassium | 0.02 | 0.02 | 0.02 | 0.02 | 0.02 | 0.02 |
| mg Calcium/200 ml Onset Calcium | 240 | 240 | 240 | 240 | 240 | 240 |

EXPERIMENT 1-continued

|  | % w/v | | | | | |
|---|---|---|---|---|---|---|
|  | 1A | 1B | 1C | 1D | 1E | 1F |
| Precipitation (days): | | | | | | |
| 50° C. | 90 | 90 | 5 | 5 | 145 | 165 |
| 40° C. | 90 | 90 | 11 | 23 | 145 | 175 |
| Room Temperature | 94 | 90 | 12 | 25 | 165 | 190 |

For each formulation, the powders were blended and then dissolved in water. The liquid was then transferred to glass bottles and pasteurized in a hot water bath. The total heating and cooling time was about 20 minutes with the product temperature at 95–100° C. for at least ten minutes.

The data show improved stability against calcium precipitation in sugar-free formulations with the use of calcium chloride, calcium lactate gluconate, and in-situ formed calcium citrate compared to formulations containing: 1). calcium lactate gluconate alone; 2). in-situ formed calcium citrate alone; 3). a combination of calcium lactate gluconate and calcium chloride; and 4). a combination of calcium chloride and in-situ formed calcium citrate. No comparison was made with a calcium chloride only formulation since the use of calcium chloride alone results in a very salty formulation unsuitable for commercial sale.

The formulations were prepared as in Experiment 1.

The data show improved stability against calcium precipitation with the use of calcium chloride, calcium lactate gluconate, and in-situ formed calcium malate compared to formulations containing: 1). calcium lactate gluconate alone; 2). in-situ formed calcium malate alone; 3). a combination of calcium lactate gluconate and calcium chloride; and 4). a combination of calcium chloride and in-situ formed calcium malate. No comparison was made with a calcium chloride only formulation since the use of calcium chloride alone results in a very salty formulation unsuitable for commercial sale.

EXPERIMENT 2

|  | % w/v | | | | | |
|---|---|---|---|---|---|---|
|  | 2A | 2B | 2C | 2D | 2E | 2F |
| Ca(OH)$_2$ | 0 | 0 | 0.22 | 0.17 | 0.14 | 0.1 |
| CaCl$_2$.2H$_2$O | 0 | 0.1 | 0 | 0.1 | 0.1 | 0.1 |
| Gluconal CAL | 1.14 | 0.88 | 0 | 0 | 0.16 | 0.36 |
| Malic acid for Neutralization | 0 | 0 | 0.37 | 0.29 | 0.24 | 0.17 |
| Excess Malic acid | 0.5 | 0.5 | 0.5 | 0.5 | 0.5 | 0.5 |
| Xanthan Gum | 0.036 | 0.036 | 0.036 | 0.036 | 0.036 | 0.036 |
| Yellow 5 | 0.0003 | 0.0003 | 0.0003 | 0.0003 | 0.0003 | 0.0003 |
| Yellow 6 | 0.0016 | 0.0016 | 0.0016 | 0.0016 | 0.0016 | 0.0016 |
| Orange Flavor | 0.25 | 0.25 | 0.25 | 0.25 | 0.25 | 0.25 |
| Aspartame | 0.02 | 0.02 | 0.02 | 0.02 | 0.02 | 0.02 |
| Acesulfame potassium | 0.02 | 0.02 | 0.02 | 0.02 | 0.02 | 0.02 |
| mg Calcium/200 ml | 240 | 240 | 240 | 240 | 240 | 240 |
| Onset Calcium Precipitation (days): | | | | | | |
| 50° C. | 98 | 98 | 48 | 59 | 150 | 170 |
| 40° C. | 98 | 98 | 49 | 42 | 153 | 178 |
| Room Temperature | 98 | 98 | 56 | 68 | 165 | 203 |

EXPERIMENT 3

|  | % w/v | | | | | |
|---|---|---|---|---|---|---|
|  | 3A | 3B | 3C | 3D | 3E | 3F |
| Ca(OH)$_2$ | 0 | 0 | 0.25 | 0.2 | 0.14 | 0.1 |
| CaCl$_2$.2H$_2$O | 0 | 0.1 | 0 | 0.1 | 0.1 | 0.1 |
| Gluconal CAL | 1.31 | 1.05 | 0 | 0 | 0.32 | 0.52 |
| Citric acid for Neutralization | 0 | 0 | 0.43 | 0.35 | 0.24 | 0.17 |

EXPERIMENT 3-continued

| | % w/v | | | | | |
|---|---|---|---|---|---|---|
| | 3A | 3B | 3C | 3D | 3E | 3F |
| Excess Citric acid | 0.5 | 0.5 | 0.5 | 0.5 | 0.5 | 0.5 |
| Sucrose | 14 | 14 | 14 | 14 | 14 | 14 |
| Xanthan Gum | 0.036 | 0.036 | 0.036 | 0.036 | 0.036 | 0.036 |
| Yellow 5 | 0.0003 | 0.0003 | 0.0003 | 0.0003 | 0.0003 | 0.0003 |
| Yellow 6 | 0.0016 | 0.0016 | 0.0016 | 0.0016 | 0.0016 | 0.0016 |
| Orange Flavor | 0.25 | 0.25 | 0.25 | 0.25 | 0.25 | 0.25 |
| mg Calcium/200 ml | 275 | 275 | 275 | 275 | 275 | 275 |
| Onset Calcium Precipitation (days): | | | | | | |
| 50° C. | 70 | 71 | 44 | 28 | 71 | 104 |
| 40° C. | 70 | 71 | 47 | 31 | 90 | 105 |
| Room Temperature | 70 | 71 | 47 | 31 | 91 | 104 |

The formulations were prepared as in Experiment 1.

The data show improved stability against calcium precipitation in sugar-containing formulations with the use of calcium chloride, calcium lactate gluconate, and in-situ formed calcium citrate compared to formulations containing: 1). calcium lactate gluconate alone; 2). in-situ formed calcium citrate alone; 3). a combination of calcium lactate gluconate and calcium chloride; and 4). a combination of calcium chloride and in-situ formed calcium citrate. No comparison was made with a calcium chloride only formulation since the use of calcium chloride alone results in a very salty formulation unsuitable for commercial sale.

EXPERIMENT 4

| | % w/v | | | |
|---|---|---|---|---|
| | 4A | 4B | 4C | 4D |
| Ca(OH)$_2$ | 0 | 0 | 0.2 | 0.1 |
| CaCl$_2$.2H$_2$O | 0 | 0.1 | 0.1 | 0.1 |
| Gluconal CAL | 1.31 | 1.05 | 0 | 0.52 |
| Citric acid for Neutralization | 0 | 0 | 0.35 | 0.17 |
| Excess Citric acid | 0.5 | 0.5 | 0.5 | 0.5 |
| Sucrose | 12.7 | 12.7 | 12.7 | 12.7 |
| Sorbitol | 2.2 | 2.2 | 2.2 | 2.2 |
| Xanthan Gum | 0.036 | 0.036 | 0.036 | 0.036 |
| Yellow 5 | 0.0003 | 0.0003 | 0.0003 | 0.0003 |
| Yellow 6 | 0.0016 | 0.0016 | 0.0016 | 0.0016 |
| Orange Flavor | 0.25 | 0.25 | 0.25 | 0.25 |
| mg Calcium/200 ml | 275 | 275 | 275 | 275 |
| Onset Calcium Precipitation (days): | | | | |
| 50° C. | 95 | 101 | 25 | 183 |
| 40° C. | 67 | 115 | 25 | 263 |
| Room Temperature | 98 | 116 | 64 | 263 |

The formulations were prepared as in Experiment 1.

The data again show improved stability against calcium precipitation with the use of calcium chloride, calcium lactate gluconate, and in-situ formed calcium citrate. Comparing 4D with 3F indicates additional improvement in stability when sorbitol is used with sucrose. This improvement was not seen when sorbitol alone is added to sugar-free formulations (data not shown).

EXPERIMENT 5

| Ingredients | % w/v |
|---|---|
| Ca(OH)$_2$ | 0.1 |
| CaCl$_2$.2H$_2$O | 0.1 |
| Gluconal CAL | 0.36 |
| Citric acid | 0.7 |
| Sucralose | 0.028 |
| Acesulfame Potassium | 0.012 |
| Xanthan Gum | 0.035 |
| Yellow 6 | 0.002 |
| Yellow 10 | 0.0004 |
| Liquid Orange Flavor | 0.3 |
| mg Calcium/200 ml | 240 |
| Onset Calcium Precipitation: | |
| 50° C. | >10 months |
| 40° C. | >10 months |
| Room Temperature | >10 months |

A 1000-L batch of the above formulation was prepared. The dry ingredients were blended in a large plastic bag, and then added with stirring to water in a mixing tank. After mixing for 30 minutes, the liquid flavor was added, and the final mix stirred for 45 minutes. The final mix was then aseptically pasteurized in a heat exchanger and filled into Tetra Brik® cartons (Tetra Pak®, Lausanne, Switzerland). The heating and cooling cycle in the heat exchanger was as follows:

| Pre-heating (30° C. to 70° C.) | 47 sec |
|---|---|
| Sterilization (70° C. to 95° C.) | 54 sec |
| Pre-cooling (95° C. to 70° C.) | 41 sec |
| Final cooling (70° C. to 25° C.) | 12 sec |

There was no calcium precipitation for the various storage conditions for up to ten months. Taste acceptability, however, was only good up to eight months; thereafter the flavor intensity was no longer acceptable. A shelf life of eight months, which is typical anyway of calcium-free beverage packed in Tetra Brik®, was adopted.

The formulation of this experiment is similar to Experiment 1F, but the stability is significantly improved. This difference is due to the lower sterilization temperature and shorter sterilization time of this formulation compared to Experiment 1F. We have found that the final calcium stability of the product depends strongly on the sterilization condition. The milder the sterilization condition, the longer the final shelf life. Without wishing to be bound by theory, it is believed that more severe sterilization conditions induce formation of critical seed crystal nuclei, upon which crystal growth take place on storage of the final product.

EXPERIMENT 6

| Ingredients | % w/v |
|---|---|
| Ca(OH)$_2$ | 0.1 |
| CaCl$_2$.2H$_2$O | 0.1 |
| Gluconal CAL | 0.38 |
| Malic acid | 0.7 |
| Sucralose | 0.025 |
| Acesulfame Potassium | 0.011 |
| Xanthan Gum | 0.035 |
| Yellow 10 | 0.00005 |
| Powder Lemon Flavor | 0.05 |
| mg Calcium/200 ml | 240 |
| Onset Calcium Precipitation: | |
| 50° C. | >10 months |
| 40° C. | >10 months |
| Room Temperature | >10 months |

A 1000-L batch of the above formulation was prepared. The dry ingredients were blended in a large plastic bag, and then added with stirring to water in a mixing tank. After mixing for 75 minutes, the final mix was then aseptically pasteurized and filled into Tetra Brik® cartons (Tetra Pak®, Lausanne, Switzerland). The heating and cooling cycle was similar to Experiment 5.

There was no calcium precipitation at the various storage conditions for up to ten months. Taste acceptability, however, was only good up to eight months; thereafter the flavor intensity was no longer acceptable. A shelf life of eight months, which is typical anyway of calcium-free beverage packed in Tetra Brik®, was adopted.

EXPERIMENT 7

| Ingredients | % w/v |
|---|---|
| Ca(OH)$_2$ | 0.1 |
| CaCl$_2$.2H$_2$O | 0.1 |
| Gluconal CAL | 0.45 |
| Malic acid | 0.7 |
| Sucrose | 12.3 |
| 70% Sorbitol | 0.8 |
| Xanthan Gum | 0.04 |
| Yellow 10 | 0.00007 |
| Powder Lemon Flavor | 0.06 |
| mg Calcium/200 ml | 260 |
| Onset Calcium Precipitation: | |
| 50° C. | >8 months |
| 40° C. | >8 months |
| Room Temperature | >8 months |

A 1000-L batch of the above formulation was prepared. 90% of the sucrose was first dissolved in water. The remaining sucrose was dry blended with the other dry ingredients in a large plastic bag, and then added with stirring to the mixing tank. After mixing for 30 minutes, sorbitol was added and the final mix stirred for 45 minutes. The final mix was then aseptically pasteurized and filled into Tetra Brik® cartons (Tetra Pak®, Lausanne, Switzerland). The heating and cooling cycle was similar to Experiment 5.

There was no calcium precipitation at the various storage conditions for up to eight months. Taste was still acceptable at eight months; therefore a shelf life of eight months was adopted.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

We claim:

1. A calcium-fortified acidic beverage wherein the calcium comprises: i). in-situ formed calcium citrate, calcium malate, or calcium citrate malate formed respectively by reacting citric acid, malic acid, and a combination of citric and malic acid with a calcium base selected from calcium hydroxide, calcium oxide, calcium carbonate, and mixtures thereof; ii). calcium chloride; and iii). calcium lactate gluconate.

2. The composition according to claim 1, wherein the pH is less than about 6.

3. The composition according to claim 2, wherein the pH is less than about 5.

4. The composition according to claim 1, wherein the final product is stable against calcium precipitation for at least about five months at room temperature and at least about two months at 50° C.

5. The composition according to claim 1, which contains at least one flavor selected from natural or artificial flavors, or combinations thereof.

6. The composition according to claim 1, wherein the citric and/or malic acid are added extraneously, naturally present in the flavors, or combinations thereof.

7. The composition according to claim 1, wherein the total excess acidity is from about 0.1% w/v to about 2% w/v.

8. The composition according to claim 7, wherein the total excess acidity is from about 0.2% w/v to about 1.5% w/v.

9. The composition according to claim 8, wherein the total excess acidity is from about 0.3% w/v to about 1% w/v.

10. The composition according to claim 1, wherein the calcium level is from about 0.04% w/v to about 0.3% w/v.

11. The composition according to claim 10, wherein the calcium level is from about 0.06% w/v to about 0.2% w/v.

12. The composition according to claim 1, wherein the amount of calcium from the in-situ formed calcium citrate, calcium malate, or calcium citrate malate is from about 30% to about 60% of total calcium.

13. The composition according to claim 1, wherein the calcium chloride is less than about 0.15% w/v as anhydrous calcium chloride.

14. The composition according to claim 13, wherein the calcium chloride is less than about 0. 1% w/v as anhydrous calcium chloride.

15. The composition according to claim 1, wherein the calcium lactate gluconate is less than about 1.5% w/v.

16. The composition according to claim 15, wherein the calcium lactate gluconate is less than about 1% w/v.

17. The composition according to claim 16, wherein the calcium lactate gluconate is less than about 0.7% w/v.

18. The composition according to claim 1, wherein the calcium lactate gluconate is a mixture of calcium lactate and calcium gluconate, with the calcium gluconate comprising at least about 20% w/w of the mixture, and where the solubility of the mixture is at least 2% w/v expressed as dissolved calcium.

19. The composition according to claim 18, wherein the calcium lactate gluconate is a mixture of about 20:80 w/w of calcium lactate:calcium gluconate.

20. The composition according to claim 1, further comprising one or more additives selected from the group consisting of colorants, preservatives, cloudifiers, sweeteners, high-intensity artificial sweeteners, vitamins and minerals, pH modifiers, viscosity modifiers, bodying agents, antioxidants, and emulsifying agents, and mixtures thereof.

21. The composition according to claim 1, wherein the sweetener comprises sucrose and sorbitol.

22. A process for the preparation of a composition according to claim 1 wherein the composition is aseptically pasteurized by heating to a maximum of 98° C. in a heat exchanger, with a total heating and cooling time in the heat exchanger of less than about ten minutes, and then packing in aseptic cartons.

23. The process according to claim 22, wherein the total heating and cooling time in the heat exchanger is less than about 5 minutes.

\* \* \* \* \*